United States Patent
Abendschön et al.

(10) Patent No.: US 6,736,590 B1
(45) Date of Patent: May 18, 2004

(54) LIFTING DEVICE FOR SUBSTRATES

(75) Inventors: Peter Abendschön, Karlsruhe (DE); Stefan Herrmann, Sternenfels (DE)

(73) Assignee: Steag Hama Tech AG (DE)

( * ) Notice: Subject to any disclaimer, the term of this patent is extended or adjusted under 35 U.S.C. 154(b) by 0 days.

(21) Appl. No.: 09/889,986

(22) PCT Filed: Jan. 13, 2000

(86) PCT No.: PCT/EP00/00190
§ 371 (c)(1), (2), (4) Date: Oct. 24, 2001

(87) PCT Pub. No.: WO00/43305
PCT Pub. Date: Jul. 27, 2000

(30) Foreign Application Priority Data

Jan. 21, 1999 (DE) .......................... 199 02 338

(51) Int. Cl.$^7$ .............................. B66C 23/00
(52) U.S. Cl. ............... 414/744.3; 414/223.01; 414/226.05; 414/27; 414/908; 414/672
(58) Field of Search ............... 414/744.3, 223.01, 414/226.05, 672, 27, 790.4, 796.7, 908, 926, 416.07, 416.11; 360/92; 369/34.01

(56) References Cited

U.S. PATENT DOCUMENTS

| | | | |
|---|---|---|---|
| 2,919,010 A | | 12/1959 | Hautau et al. |
| 3,716,134 A | * | 2/1973 | Campbell ............... 414/744.3 |
| 4,921,397 A | | 5/1990 | Watanabe |
| 5,190,136 A | | 3/1993 | Grecksch et al. |
| 5,227,708 A | * | 7/1993 | Lowrance ............. 414/222.01 |

FOREIGN PATENT DOCUMENTS

| | | |
|---|---|---|
| DE | 36 28 544 A1 | 4/1987 |
| DE | 295 18 578 U1 | 2/1996 |
| DE | 196 06 763 C1 | 4/1997 |
| JP | 5020344 | 1/1993 |

* cited by examiner

Primary Examiner—Eileen D. Lillis
Assistant Examiner—Michael Lowe
(74) Attorney, Agent, or Firm—R W Becker & Associates; R W Becker

(57) ABSTRACT

The aim of the invention is to make it as easy as possible to change a spindle in a lifting device (2) for substrates, which device comprises a support (10). To this end the support is configured such that it can be made to engage the substrate holder (25) by rotation or by pivoting.

10 Claims, 2 Drawing Sheets

LIFTING DEVICE FOR SUBSTRATES

BACKGROUND OF THE INVENTION

The present invention relates to a lifting device for substrates and has a holder.

Such lifting devices are used, for example, during the manufacture of disc-shaped substrates, such as CDs or DVDs, in order to guide the substrates on a spindle relative to their height. With such devices, generally a plurality of spindles are provided for receiving the substrates on a rotary table. Each of the spindles is provided with a so-called spacer that surrounds the spindle and upon which are placed the respective disc-shaped substrates. In an operating position of the spindle, the support of the lifting device is brought into engagement with the spacer by a lateral movement of the entire lifting device. In this position of engagement, the spacer can be raised and/or lowered by the lifting device, and in particular as a function of whether the substrates are to be stacked upon the spindle and the spacer or are to be removed therefrom.

In order to bring a new spindle into the operating position for the receipt or removal of substrates, the lifting device must first be moved away from the spindle or spacer that is in engagement with the support. A new spindle is subsequently moved into the operating position, and the lifting device is brought back into the engagement position. In this connection, not only is a device for the lateral movement of the lifting device necessary, but sensors that sense the lateral position of the lifting device are also necessary, thereby increasing the susceptibility of the lifting device to breaking down. Furthermore, due to the lateral movement of the lifting device, a larger installation space is required.

U.S. Pat. No. 2,919,010 discloses a lifting device where an arm that carries a support is moved by a drive into contact with a substrate that is to be received, for example by means of a piston. In so doing, the support directly engages the substrate, whereby in particular with sensitive substrates damage can occur to the substrate. In order to bring the substrates into the region of the lifting device, in addition to the drive for the pivoting movement a separate drive is provided for moving the substrates.

DE-A-196 06 763 discloses a transport mechanism having a grasping device for holding and transporting substrates, with the grasping device being rotatable about an axis of rotation. In order to come into engagement with substrates, the grasping device is first rotated over a substrate and is subsequently moved linearly. In so doing, the grasping device is actively not only rotatable but also is driven linearly.

DE-A-36 28 544 discloses a magnetic holding device having magnetizable elements that are displaceable relative to one another and that are in the position due to relative displacement to adapt to the surface of the work piece. To receive the work piece, the magnetizable elements are magnetized and are secured relative to one another in order, when a magnetic force is applied, to prevent a relative displacement of the elements relative to one another.

Proceeding from the above mentioned state of the art, it is an object of the present invention to provide an economical apparatus that enables a spindle change in a simple and reliable manner.

SUMMARY OF THE INVENTION

Pursuant to the present invention this object is realized in that the substrate support can be brought into engagement with the substrate or a substrate holder by rotating or pivoting the substrate support, whereby the rotation or pivoting of the support is effected by a movement of the substrate holder. In this way, a simple spindle exchange is made possible without a lateral movement of the lifting device. This eliminates the drive for the lateral movement of the lifting device, as well as the sensors for sensing the lateral position, thereby eliminating the cost for these devices. The device overall requires fewer parts, thereby increasing the reliability of the device. By means of the passive rotation or pivoting of the support, there results a particularly simple control of the device, since only the movement of the substrate holder has to be precisely controlled.

Pursuant to one preferred specific embodiment of the present invention, the support is rotatable about a central axis.

To ensure that the support is disposed in a predetermined position when it is not in engagement with a substrate holder, the support is biased in a rest position. In this way, a respectively uniform engagement is achieved between the support on the one hand and the substrate holder on the other hand.

The biasing is preferably achieved by at least one magnet. By using as least one magnet, a biasing is achieved in a simple and reliable manner, whereby the drawbacks of mechanical devices, such as fatigue and/or failure of the mechanical parts, are avoided. Pursuant to one preferred specific embodiment of the present invention, at least one magnet is provided on a supporting arm of the lifting device and/or a plurality of magnets, especially four magnets, are provided on the support.

In order to provide a good engagement between the support and the substrate holder, and to thereby effect the rotation or pivoting of the support, the support is provided with preferably essentially radially projecting legs.

Pursuant to the presently preferred specific embodiment of the present invention, the support has a star shape with four or five legs.

The lifting device is advantageously furthermore provided with sensor means for sensing the lifting height of the substrate holder.

BRIEF DESCRIPTION OF THE DRAWINGS

The present invention will be subsequently further explained with the aid of a preferred specific embodiment of the invention with reference to the figures, in which.

DESCRIPTION OF PREFERRED EMBODIMENTS

Figure 1:
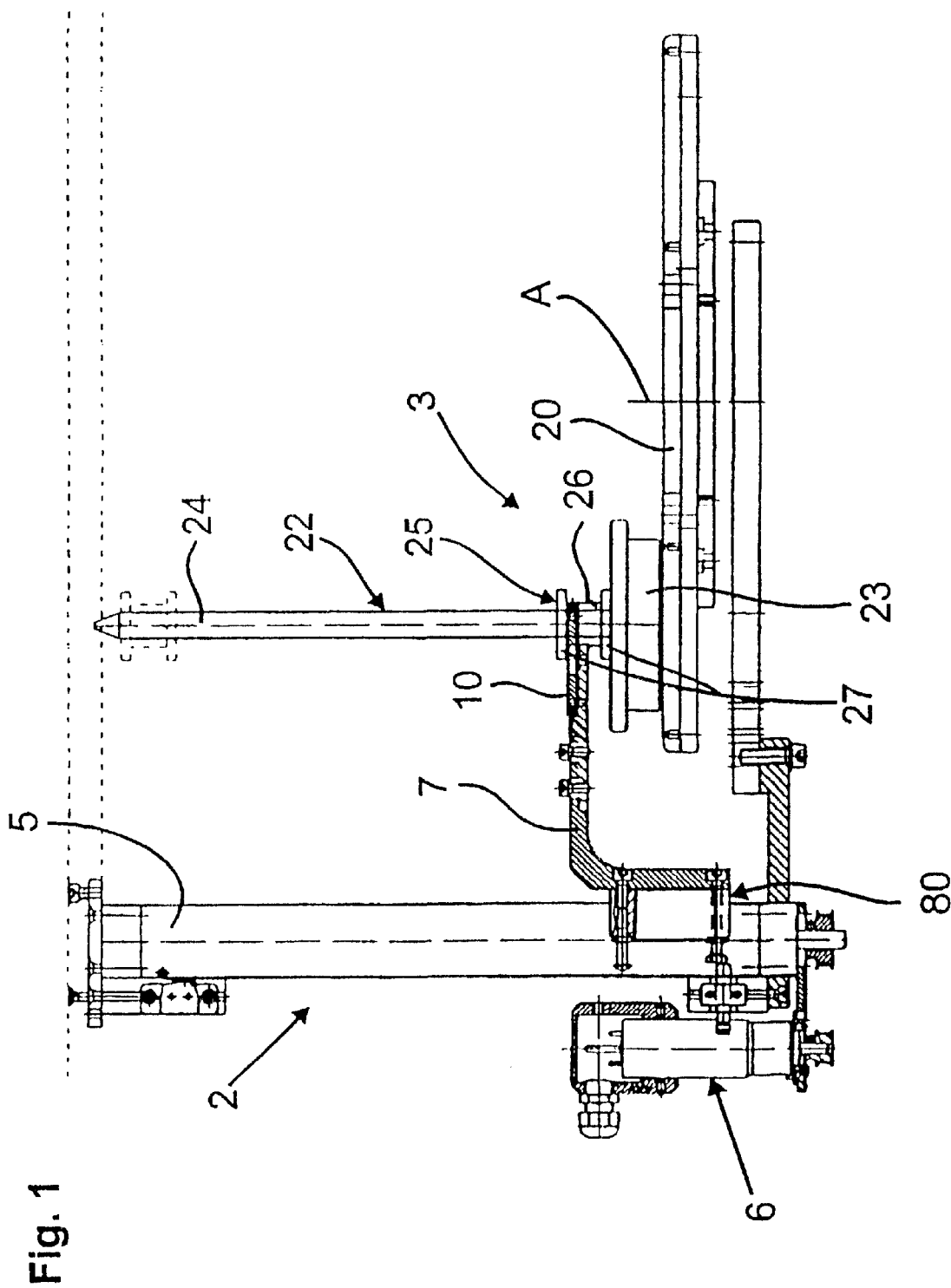
FIG. 1 is a schematic side view of the lifting device of the present invention.

FIG. 1 is a side view of a substrate handling apparatus that has a lifting device 2 and a substrate receiving device 3.

The lifting device 2 is provided with an essentially vertically disposed guide bar 5, as well as a slide carriage 80 that is linearly moveable on the guide bar and is provided with a supporting arm 7. The slide carriage 80, along with the arm 7, is displaceable in a defined and known manner along the guide bar via an appropriate drive unit 6.

Figure 2:
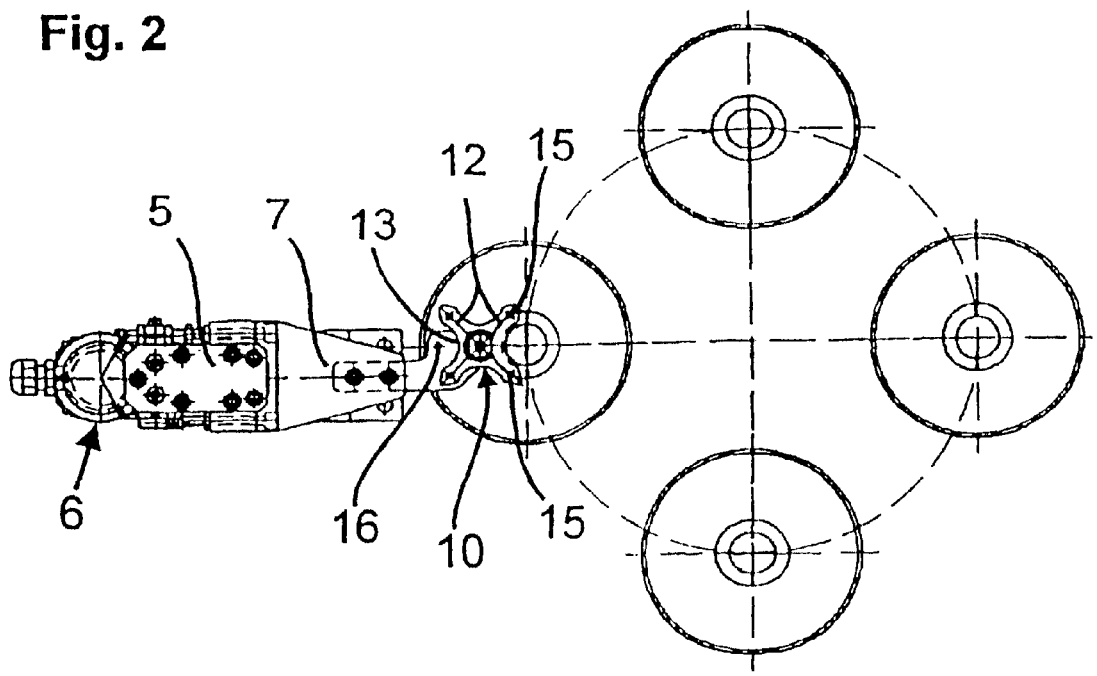
FIG. 2 is a plan view of the inventive lifting device in a position of engagement.
Figure 3:
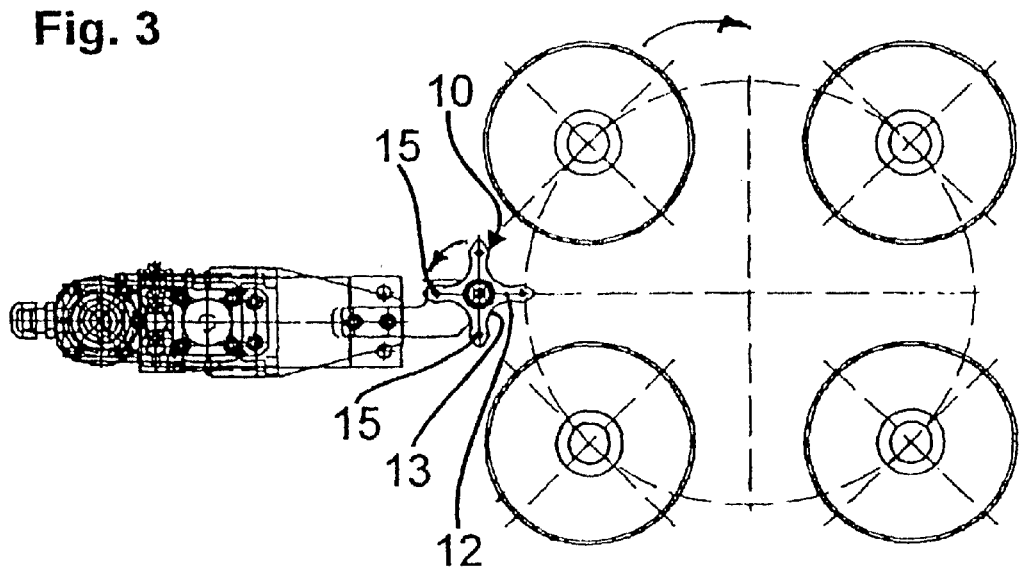
FIG. 3 is a plan view of the inventive lifting device in an intermediate position.

As can be best seen in the top views of FIGS. 2 and 3, a rotatable support in the form of a star 10 is provided on an end of the supporting arm that is spaced from the slide carriage 80. It can furthermore be seen from these plan views that the star 10 has four legs 12. Respective curved engagement surfaces 13 are defined between the legs 12. Magnets 15 are provided at or in the vicinity of the ends of the legs 12. The star 10 is freely rotatably mounted about a central axis. All of the magnets 15 have the same spacing relative to the central axis.

Disposed on the supporting arm 7 of the slide carriage 80 is a magnet 16 that has the same spacing relative to the central axis of the star 10 as do the magnets 15. The magnet 16 is oriented in such a way that it exerts a magnetic force of attraction upon the magnets 15. Due to the magnetic force of attraction between magnet 16 and the magnets 15, the star 10, to the extent it is not rotated by an external force, is moved into the position shown in FIG. 3 and is held in this position.

The substrate receiving device 3 is disposed next to the lifting device 2. The substrate receiving device 3 is provided with a rotary table 20 that is rotatable about a central axis A. Disposed on the rotary table 20 are a plurality (here 4) of substrate receiving units 22, each of which has a base 23, an elongated, rod-shaped spindle 24, and a spacer 25 that surrounds the spindle 24.

The base 23 of each substrate receiving unit 22 is seated on a surface of the rotary table 20 and is positively connected therewith. The spindle 24 of each substrate receiving unit 22 is held by the base 23 perpendicular to the surface of the rotary table 20.

The spacer 25 of each substrate receiving unit 22 is provided with an essentially cylindrical body 26 having a central opening. The cylindrical body 26 surrounds the respective spindle 24 and can be displaced in height along the spindle 24. The outer periphery of the cylindrical body has a stepped configuration, and in particular such that it is recessed between an upper and lower end. In this way, a respective circumferential flange 27 is formed at the upper and at the lower end.

The substrate receiving units 22 are uniformly disposed on a circular line about the central axis A of the rotary table 20.

During rotation of the rotary table 20 the substrate receiving units 22 are also rotated along with the table 20. Due to this rotation, the recessed outer periphery of a spacer 25 of one of the substrate receiving units 22 comes into contact with a leg 12 of the star 10. Upon further rotation, the star 10, due to the contact with the spacer 25, is rotated into the position shown in FIG. 2. In this position, the engagement surface 13 is in contact with the recessed outer periphery of the spacer 25. By means of a vertical movement of the slide carriage 80 along the guide bar 5, the star comes into contact, from below, with the upper flange 27 of the spacer. During a further upwardly directed vertical movement, the spacer 25 is raised along the spindle 24. A raised position of the spacer 25 is indicated in FIG. 1 by dashed lines. In this raised position, a substrate, such as a CD or a DVD, can be placed upon the spacer 25. The slide carriage 80 is thereupon lowered by the thickness of the deposited CD, so that a new CD can be stacked thereupon. This process continues until the spacer is disposed in the lowermost position, which indicates that the spindle is full.

In order to receive further substrates upon the substrate receiving units 22, the rotary table 20 is rotated in order to bring a new substrate receiving unit 22 into contact with the rotary star 10, and the process in repeated.

The apparatus can also be used in the reverse sequence for the removal of substrates from the spindle 24. In this case, the spacer of a full spindle 24 is brought into contact with the star 10. A spacer 25 is subsequently raised in steps along the spindle 24 in order to enable removal of the substrates. After the last substrate has been removed, the lifting device moves the spacer 25 down. The now empty spindle 24 is subsequently advanced and a new, full spindle is brought into engagement with the star 10.

Although the present invention has been described with the aid of a preferred embodiment, it is to be understood that the invention is not limited to the specifically illustrated embodiment. In particular, other forms of the rotary star are possible. Instead of the rotary star, it would also be possible to provide a pivotable element that, via a movement of a spindle, is pivoted out of a rest position into an engagement position. After a further movement of the spindle, the engagement is released and the pivotable element is returned to the rest position, for example by means of a spring.

"The specification incorporates by reference the disclosure of German priority document 199 02 338.7 FILED 21 Jan. 1999 as well as European Patent Application priority document PCT/EP00/00190 filed 13 Jan. 2000.

The present invention is, of course, in no way restricted to the specific disclosure of the specification and drawings, but also encompasses any modifications within the scope of the appended claims."

What is claimed is:

1. A lifting device for substrates, comprising:

a substrate holder;

a movable support that is adapted to be brought into or out of an operating position in which it is engaged with said substrate holder via a rotation of said support, said support being adapted to effect at least one of raising and lowering said substrate holder in said operating position of said support;

means for moving said substrate holder into and out of contact with said support to effect said rotation of said support; and means for lifting or lowering said support.

2. A lifting device according to claim 1, wherein said support is rotatable about a central axis.

3. A lifting device according to claim 1, wherein said support is adapted to be biased in a rest position.

4. A lifting device according to claim 3, wherein at least one magnet is provided for biasing said support in said rest position.

5. A lifting device according to claim 4, wherein at least one magnet is provided on a supporting arm of said lifting device.

6. A lifting device according to claim 4, wherein a plurality of magnets are provided on said support.

7. A lifting device according to claim 6, wherein four magnets are provided on said support.

8. A lifting device according to claim 1, Wherein said support is provided with essentially radially extending legs.

9. A lifting device according to claim 8, wherein said support has a star shape with four or five legs.

10. A lifting device according to claim 1, wherein sensor means are provided for sensing a lifting height of a substrate.

* * * * *